Feb. 19, 1952     W. T. HASWELL, JR     2,585,934
APPARATUS FOR MEASURING RAPID COOLING RATES
Filed Feb. 12, 1947
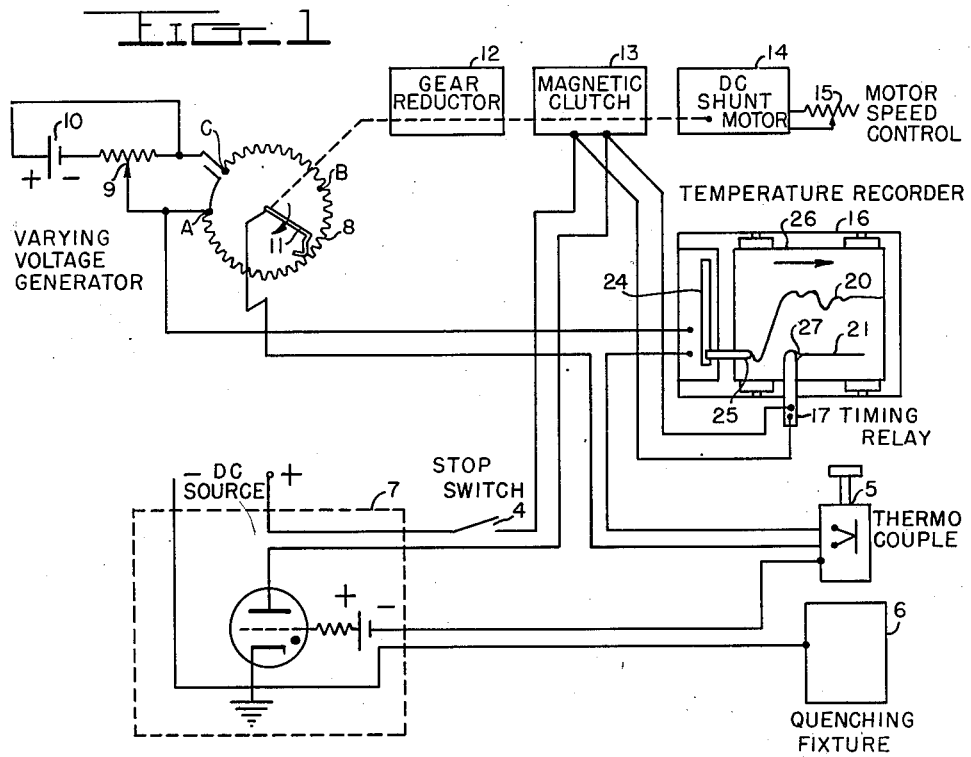
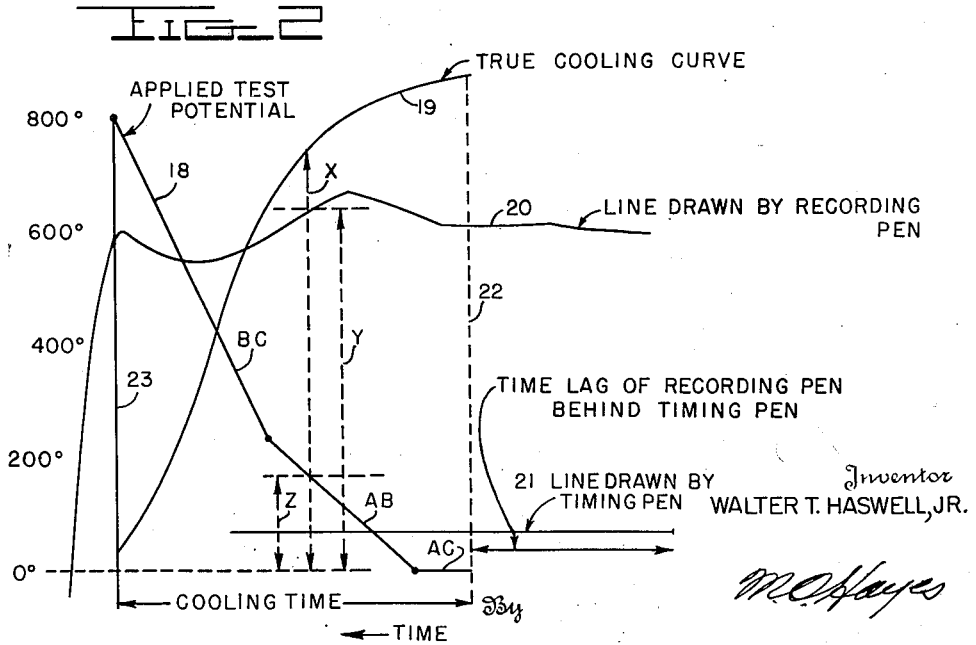
Inventor
WALTER T. HASWELL, JR.

Patented Feb. 19, 1952

2,585,934

UNITED STATES PATENT OFFICE 2,585,934

APPARATUS FOR MEASURING RAPID COOLING RATES

Walter T. Haswell, Jr., United States Navy

Application February 12, 1947, Serial No. 727,982

6 Claims. (Cl. 73—359)

(Granted under the act of March 3, 1883, as amended April 30, 1928; 370 O. G. 757)

This invention relates to temperature recording systems, and more particularly to a system capable of recording very large and rapid temperature variations.

Existing apparatus for recording temperature variations is not able to accurately follow rapid variations over large temperature ranges. An apparatus used in measuring the cooling rates upon quenching of heated metallurgical specimens comprises a thermocouple attached to the specimen and electrically connected to a recording device which records temperature against time by a stylus marking on a moving sheet of paper. It may be desired to measure cooling rates of the order of 2400° centigrade per second. The stylus actuating movement in recorders of the type described above is incapable of the rapid movement required to follow such rapid temperature variations. However, if a varying voltage is provided simulating that produced by the thermocouple, and varying inversely thereto, then the actual cooling rate can be calculated from the summation of these two voltages, which will have a variation not exceeding the limits of the temperature recorder.

It is therefore an object of this invention to provide a system for recording very large and rapid temperature variations.

It is another object of this invention to provide a varying voltage which will simulate a known temperature variation.

It is another object of this invention to provide a voltage generator whose output simulates a large temperature variation as measured by a thermocouple.

It is still another object of this invention to provide a voltage generator whose output simulates a large temperature variation as measured by a thermocouple and can be applied opposing the variation of the thermocouple voltage to a temperature recorder producing a record of the difference between the simulated temperature variation and the actual variation.

Other objects and advantages of the invention will be apparent from the following description and accompanying drawing, in which:

Fig. 1 is a schematic diagram, partly in block, of one embodiment of this invention;

Fig. 2 is a chart of curves used in connection with the embodiment in Fig. 1.

Briefly, this invention enables existing types of temperature variation recorders such as hereinbefore described to measure rates of temperature change which heretofore exceeded their limits. A standard temperature recorder operated by the voltage output of a thermocouple may be used. Said voltage output is estimated for the specimens to be measured and a voltage varying inversely to the thermocouple voltage is applied to the recorder in series addition to the thermocouple voltage, which will then respond to only the difference between the two voltage variations—a variation well within its capabilities. The recorder temperature less the simulated temperature is the temperature of the specimen.

Referring now to the drawing in detail, Fig. 1 is a schematic diagram partly in block of one embodiment of this invention showing the arrangement of the apparatus which must be added to a standard temperature recorder. This apparatus includes a varying voltage generator comprising a potentiometer 8 whose resistance windings may not be linear, a voltage source 10 for energizing same and control means therefor, and mechanical means including motor 14, clutch 13 and gear reductor 12 for rotating the contact 11 on said potentiometer at a controllable rate. A thyratron synchronizing circuit 7 is also included to indicate the beginning of the quenching operation on the recorder.

The temperature recorder 16 may be any available type utilizing a thermocouple 5 which supplies a signal voltage to drive a recording pen 25 across a sheet of paper 26 which is moved by the recorder to supply the time base. Said paper is preferably marked in degrees so as to transfer the signal voltage to temperature. The recording stylus 25 moves in the slot 24 responsive to voltages supplied by the thermocouple 5 and the potentiometer 8.

The standard temperature recorder 16, in combination with the above apparatus can be used to measure temperature variations vastly in excess of that which can be measured by the recorder alone. This is accomplished by requiring the recorder to measure only the difference between the voltage variation from the thermocouple 5 and from the potentiometer 8, instead of the large voltage variation from said thermocouple alone.

The varying voltage generator, as shown comprises a battery potential source 10 across which is connected a voltage divider 9, and rotary potentiometer 8 excited thereby. Said voltage generator is connected in series with the thermocouple 5, and is adjusted, as described below, to deliver a voltage variation approximately equal but opposing that produced by the thermocouple 5 upon the quenching of the particular specimen under test.

The magnitude of the varying voltage to be generated may be adjusted by shorting out the thermocouple 5, which is in series with the voltage generator, and adjusting the voltage divider 9 with the rotating tap 11 set at point C on the potentiometer until the recorder reads the temperature of the specimen. The cooling time is estimated from whatever statistics may be available or by trial and error. The potentiometer 8 must then be adjusted so that as its contact arm 11 is rotated, its voltage output will drop to zero in the estimated cooling time. Said contact arm 11 is rotated by a D. C. shunt wound motor 14 through a magnetic clutch 13 and a gear reducer 12. The rotation speed may be roughly approximated by a rough adjustment of the gear reducer and accurately adjusted by the motor speed control consisting of a variable resistance 15 in series with the rotor of the motor 14. The voltage divider 9 energizes the potentiometer 8 at the points A and C. The linear resistance of the potentiometer 8 between points A and B is of a different order than that between B and C, thus providing a nonlinear output from point A and sliding contact 11 as contact 11 is rotated. When the sliding contact 11 reaches point A the voltage output of the potentiometer becomes zero.

In order that the voltage from potentiometer 8 can be supplied at the exact instant the specimen is quenched, a synchronizing means is provided. For this purpose a thyratron circuit 7 is quiescently operated just below its firing potential. A contact is added to the quenching fixture 6 which completes the thyratron's firing circuit the moment the specimen is immersed in said fixture. The thyratron then simultaneously energizes the magnetic clutch 13 to apply a turning torque to the potentiometer 8, and energizes the timing relay 17 to apply a timing pen 27 to said recorder paper. A stop switch 4 is included in the B+ lead to the thyratron 7 to enable extinction of said thyratron at the end of the run.

After setting up the potentiometer 8 as above described for the proper voltage variation, it must be zero set. This is done by manually rotating the contact 11 to point C and adjusting the voltage divider 9 until the recorder reads the maximum temperature of the specimen with the thermocouple 5 shorted. The contact 11 is then manually rotated clockwise to point A where it delivers zero voltage from the battery. This manual rotation also takes up any slack in the gear mechanism. The battery 10 connections to the voltage divider 9 is made so that the voltage variation produced when contact 11 is rotated counterclockwise will vary in opposite direction to the variation of the thermocouple voltage when it is cooling. Contact 11 is rotated counterclockwise by gear reducer 12 during the temperature run. The zero position of the recording pen should then be offset, since for this operation the pen records temperature differences, it should be set so that it can deviate in either direction without running off the paper. As indicated in the example discussed in connection with Fig. 2, setting the particular recorder used to read 300° low was found satisfactory. A reasonably accurate calculation of the varying voltage will require the recorder to respond to temperature variations of less than 50° centigrade per second.

In Fig. 2, a sample set of curves for a temperature run are shown. The distance between the two vertical lines 22 and 23 is a measure of the cooling time. It will be noted that the timing pen 27 is generally not located at the same point of time as the recording pen with respect to their markings on the paper. The time lag between the pens is the physical distance between the recording pen 25 and the timing pen 27 as clearly shown in Fig. 1. In measuring the cooling time this time lag must be subtracted from the distance between the beginning of the timing curve 21 and the end of the cooling curve 19. The end of the cooling curve is easily observed from the sharp drop in the line 20 drawn by the recording pen (intersection of lines 20 and 23).

The curve 18 is a plot of the voltage output of the voltage generator of Fig. 1, plotted in degrees centigrade of simulated temperature against time in seconds, part BC of said curve is the voltage developed between points B and C of the potentiometer 8, part AB is that voltage developed between points A and B, and part AC is the zero voltage output when the sliding contact 11 is between A and C of the potentiometer 8. Since these resistance values may be changed and the time of rotation of the potentiometer may also be changed, the shape of the curve 18 may be controlled between wide limits. Therefore, by plotting the estimated temperature variation it is possible to match the output curve of potentiometer 8 with reasonable accuracy.

Curve 20 of Fig. 2 is the actual temperature variation output of the temperature recorder as made by the recording pen. Curve 19 is the recorded curve 20 plus the effect of the recording pen minus the simulated temperature variation curve 18. Curve 19 is therefore the true cooling curve of the specimen under test. It will be noted that if the simulated temperature variation curve 18 is carefully estimated, the recorded variation, curve 20, is very small.

In plotting the true cooling curve 19, the offset of the recording pen must be taken into account. For an offset of $-300°$ centigrade, points along curve 19 may be calculated from the following formula:

$$X = Y + 300 - Z$$

where at any given time, X is the ordinate of the true cooling curve 19, Y is the ordinate of the curve 20 drawn by the recorder, 300 represents the restoration of the $-300°$ offset, and Z is the ordinate of the estimated curve 18. The length of the cooling time may be worked out from the curve, since the starting time is indicated by the timing pen, it is only necessary to read the time at which the cooling curve indicates the temperature of the quenching liquid.

Although certain specific embodiments of this invention have been herein disclosed and described, it is to be understood that they are merely illustrative of this invention and modifications may, of course, be made without departing from the spirit and scope of the invention as defined in the appended claims.

The invention described herein may be manufactured and used by or for the Government of the United States of America for governmental purposes without the payment of any royalties thereon or therefor.

What is claimed is:

1. A system for recording large and rapid temperature variations comprising in combination, a thermocouple, a temperature recording device responsive to the output of said thermocouple, a variable voltage generating means including a motor driven rotatable potentiometer operative to produce a varying voltage signal which is substantially complementary to the output voltage variation of said thermocouple in response to a particular temperature variation, said voltage signal being introduced in series aiding with the output of said thermocouple to said recording device, whereby said temperature recording device operates responsive to the difference in voltage variation between said thermocouple and voltage generating means.

2. A system for recording the cooling rates of metallurgical specimens upon quenching, comprising a thermocouple attached to said specimen, a temperature recording device operative responsive to said thermocouple, a voltage generating means operative to generate a voltage signal which is substantially complementary to the output of said thermocouple upon the quenching of said specimen, said output of said last named means being introduced in series aiding with said thermocouple to said recording device, whereby said recording device operates to record the difference in said voltage variations, and synchronizing means associated with said voltage generator for coincidentally starting the generation of an output signal from said generator with the initiation of the quenching operation.

3. A system for recording the cooling rates of metallurgical specimens upon quenching, comprising a thermocouple attached to said specimen, a temperature recording device operative responsive to said thermocouple, a voltage generating means including a potentiometer, a mechanical means for driving same, and a power source and associated voltage divider for energizing same, said voltage generating means being operative to generate a voltage signal which is substantially complementary to the output of said thermocouple upon the quenching of said specimen, said output of said potentiometer being introduced in series aiding with said thermocouple to said recording device, whereby said recording device operates to record the difference in said voltage variations, and synchronizing means associated with said voltage generator for coincidentally starting the generation of an output signal from said generator with the initiation of the quenching operation.

4. A system for recording large and rapid temperature variations comprising in combination, a thermocouple, a temperature recorder responsive to the voltage output of said thermocouple, a variable voltage generating means adapted to generate a voltage varying substantially at the same rate as the output voltage variation of said thermocouple in response to a particular temperature variation, the respective outputs of said generating means and said thermocouple being connected in series to the temperature recorder whereby said recording means will record only the difference in variation between said generated voltage and said thermocouple voltage.

5. A system for recording large and rapid temperature variations comprising in combination, a thermocouple, a recording means adapted to transcribe small temperature variations as measured by said thermocouple, a variable voltage generating means adapted to generate a variable voltage substantially complementary to the output voltage variation of said thermocouple in response to a particular temperature variation, means connecting said thermocouple and said voltage generating means in series aiding to said recording means whereby said recording means will record only the difference in variation between said generated voltage and said thermocouple voltage regardless of the amplitude of the temperature variation.

6. A system for recording large and rapid temperature variations comprising in combination, a thermocouple, a temperature recording device responsive to the output of said thermocouple, a variable voltage generating means including a rotatable potentiometer operative to produce a variable voltage signal which is substantially complementary to the output voltage variation of said thermocouple in response to a particular temperature variation, synchronizing means for initiating said potentiometer produced voltage variation coincident with the temperature produced thermocouple voltage variation, said voltage generating means and said thermocouple being connected in series aiding to said recording device whereby said recording device is responsive only to the difference in voltage variation between said thermocouple and voltage generating means.

WALTER T. HASWELL, Jr.

REFERENCES CITED

The following references are of record in the file of this patent:

UNITED STATES PATENTS

| Number | Name | Date |
| --- | --- | --- |
| 1,377,274 | Porter | May 10, 1921 |
| 1,753,486 | Travis | Apr. 8, 1930 |
| 2,114,330 | Borden | Apr. 19, 1938 |
| 2,197,635 | Eggers | Apr. 16, 1940 |